United States Patent [19]

Goddard

[11] Patent Number: 4,640,823

[45] Date of Patent: Feb. 3, 1987

[54] ALKALINE LEACHING OF VANADIUM BEARING RESIDUES

[75] Inventor: John B. Goddard, Grand Island, N.Y.

[73] Assignee: U.S. Vanadium Corporation, Danbury, Conn.

[21] Appl. No.: 839,093

[22] Filed: Mar. 13, 1986

[51] Int. Cl.$^4$ ............................................. C01G 31/00
[52] U.S. Cl. ........................................ 423/68; 423/63; 423/67
[58] Field of Search ..................................... 423/62, 68

[56] References Cited

U.S. PATENT DOCUMENTS

| | | | |
|---|---|---|---|
| 1,999,807 | 4/1935 | Gibbs | 423/68 |
| 3,343,909 | 9/1967 | Kim | 423/68 |
| 3,873,669 | 3/1975 | Guillaud | 423/68 |
| 4,061,712 | 12/1977 | Morgan et al. | 423/68 |
| 4,443,415 | 4/1984 | Queneau et al. | 423/68 |

*Primary Examiner*—H. T. Carter

[57] ABSTRACT

A process is provided for the recovery of vanadium values from vanadium-bearing residues, such as fly ash, boiler ash and scrubber residues from the combustion of crude oil fractions. The process employs a combination of alkaline metal bases, such as sodium carbonate and sodium hydroxide.

19 Claims, No Drawings

ALKALINE LEACHING OF VANADIUM BEARING RESIDUES

FIELD OF THE INVENTION

This invention relates in general to a process for recovering vanadium values. In one aspect, this invention is directed to the extraction of vanadium values from high-acid-consuming residues, such as those derived from burning residual oil in power plants. In a further aspect, this invention relates to the alkaline leaching of vanadium-bearing materials, including fly ash and residues from power plants using a combination of alkaline metal bases such as carbonates and hydroxides.

BACKGROUND OF THE INVENTION

The alkaline leaching of vanadium-bearing materials is a known process for the recovery of vanadium values from carbonaceous residues derived from petroleum refining or from the burning of carbonaceous fuels. Vanadium and other metals, being relatively non-volatile, remain in the residues during refining and in the ash during combustion as fuels, as from example, in power plants. However, the efficient and economic extraction of vanadium from these carbonaceous residues without the simultaneous extraction of deleterious amounts of priority pollutant metals, such as lead, cadmium, and chromium, has remained a problem.

Although sulfuric acid has been used successfully as a leachant for certain residues, such as fly ash, acid leaching is also known to dissolve appreciable quantities of toxic metals present. Moreover, many power plant residues, for example, boiler ash and scrubber sludges, have been treated with bases, such as lime, limestone, or magnesium hydroxide to prevent corrosion and to scrub acidic components released during combustion. The presence of these bases can require extremely high consumption of acid during attempts to extract vanadium by acid leaching. Hence, for economic considerations acid leaching of such residues is usually not warranted.

It is also known that alkaline leaching can be used to extract vanadium from base-containing residues provided that vanadium is in an oxidized state (pentavalent) or that an oxidant is present during the leaching procedure. Although alkaline leaching generally represses the dissolution of priority pollutant metals, vanadium recoveries are frequently lower. Because alkaline leaching extracts less metals, the further processing of the liquor is simplified, and the effluents can be readily acceptable for disposal.

Various methods have been proposed in the literature for the recovery of vanadium values by leaching with alkaline materials. For example, in U.S. Pat. No. 3,873,669, there is disclosed a process for the recovery of vanadium from fly ash by treating the fly ash with a concentrated caustic soda solution to selectively solubilize vanadium, and then adding calcium oxide to precipitate silica before recovering the vanadium.

A further method has been disclosed in the patent literature for the recovery of vanadium values by leaching the vanadium-containing material with caustic and thereafter precipitating insoluble salts of vanadium with an ammonium containing compound such as gaseous ammonia or ammonium hydroxide. This method is disclosed in U.S. Pat. No. 4,061,712 and is indicated to provide greater yields of the desired product.

As indicated above, vanadium-bearing residues which contain appreciable amounts of alkaline earth bases such as MgO, CaO, CaCO$_3$, MgCO$_3$, Ca(OH)$_2$, Mg(OH)$_2$ are generally quite refractory to alkaline leaching. The vanadium leach yields are often less than 50 percent which is not satisfactory. Usually leaching with Na$_2$CO$_3$ gives inferior results to leaching with NaOH.

The object of the alkaline leach is, of course, to form highly water-soluble vanadates, e.g., sodium vanadates such as NaVO$_3$, Na$_4$V$_2$O$_7$, or Na$_3$VO$_4$. This can be conveniently represented by the equation:

$$V_2O_5(s) + 2NaOH = 2NaVO_3 + H_2O$$

where NaVO$_3$ (sodium metavanadate) has a high solubility, i.e., greater than 100 grams V$_2$O$_5$/liter.

Normally, V$_2$O$_5$ is not the actual species present in these residues. Various calcium and magnesium vanadates are present which dissolve with much greater difficulty. Also, some vanadates may be reduced, which requires an oxidant along with an alkaline leach reagent to solubilize the vanadium. Oxygen, air or hydrogen peroxide can serve as oxidants. Other more expensive but less practical oxidants could be used also, such as ammonium persulfate, potassium permanganate, and sodium hypochlorite.

Accordingly, prior to the present invention there had been no simple and efficient method for the recovery of vanadium from residues in yields higher than many of the methods currently employed in commercial operations.

SUMMARY OF THE INVENTION

In its broad aspect, the present invention is directed to a process for recovering vanadium values by alkaline leaching of vanadium-bearing residues using a combination of alkaline metal bases such as carbonates and hydroxides.

DETAILED DESCRIPTION OF THE INVENTION

As indicated above, the present invention relates to the recovery of vanadium values by the alkaline leaching of vanadium-bearing residues. The process of the invention is directed to the recovery of vanadium values from vanadium-bearing residues which contain high-acid-consuming materials, including significant amounts of magnesium, calcium or iron bases. The process comprises the steps of:

(1) leaching the residues with an aqueous solution containing at least one alkaline metal carbonate and at least one alkaline metal hydroxide, in a ratio of carbonate to hydroxide of from about 4:1 to about 1:4;

(2) separating a vanadium-bearing liquor and (3) recovering vanadium values therefrom.

The proportions of carbonates and hydroxides for optimum performance are not necessarily critical and the preferred amounts will probably differ for different vanadium-bearing residues. However, it has been found that when the alkali metal is sodium, at least 10% of the sodium must come from either NaOH or Na$_2$CO$_3$ (the balance from the other). A narrower range would be at least about 20% of the sodium from the minor reagent, that is, a range of 20% NaOH–80% Na$_2$CO$_3$ to 80% NaOH–20% Na$_2$CO$_3$. The total amount of sodium used will depend on the leach conditions, the amenability of the residue to alkaline leaching, and the degree of vanadium extraction desired.

In practice, it has been found that while the preferred alkali metal is sodium, other alkali metals, such as, potassium can also be employed. It is also possible to employ one or more alkaline carbonates and one or more alkaline hydroxides, as well as combinations thereof.

The amount of the combined alkaline metal compounds, that is the alkali metal carbonate and the alkali metal hydroxide, should be chosen such that the total concentration of metal is from about 200 to about 2000 pounds metal per ton of residue. Preferred concentrations are from about 400 to about 1000 pounds metal per ton of residue. Amounts above and below these concentrations can be employed but are less preferred if optimum recover of the vanadium values is desired.

As indicated above, the process of the present invention is particularly useful for the recovery of vanadium from high-acid-containing residues which have significant amounts of magnesium, calcium or iron bases present in the residue.

By "high-acid-containing materials" as used throughout this specification and appended claims is meant the acid consuming ability of the residues being processed which usually will be not less than 500 to 1000 lb $H_2SO_4$/ton of residue.

Additionally, residues which contain significant amounts of magnesium, calcium or iron bases are those having at least 10 weight percent of these metals based on the total weight of the residue.

Oxidants can and in many cases should be used along with the alkaline leach reagents to ensure that the vanadium is in the soluble pentavalent state. Oxygen, air, or oxygen-enriched air generally can be employed. Other oxidants can also be used in the process of this invention and include compounds such as hydrogen peroxide, chlorine, sodium hypochlorite, ammonium persulfate, and potassium permanganate. Air or oxygen is preferred because of the low cost and convenience.

The process of the present invention is applicable to vanadium-bearing residues which contain significant amounts of alkaline earth bases and ferrous or ferric iron bases, such as fly ash, boiler ash, and scrubber sludge from electric power plants which use heavy crude oil fractions as fuel. The residues should be in a finely divided state, e.g., 100 mesh or finer, for optimum extraction, but often they already exist in this degree of fineness and need not be ground. Leaching is generally at as high a percent solids slurry as practicable, e.g., about 10%-30% solids depending on the rheological properties of the residue. The higher percent solids allows a stronger reagent concentration to be used without increasing the reagent/residue weight ratio. Stronger base concentrations normally will increase the rate of extraction.

The leaching itself can take place in any suitable leach vessel, such as an agitated tank; a pachuca tank can be used where oxygen or air is to be added. Pressure vessels also can be used, as it is often advantageous to operate at temperatures above the atmospheric boiling point. The temperature of leaching should be such to give good vanadium extractions in a reasonable time period, e.g., 0.5-24 hours. Generally, elevated temperatures, e.g., 70 C. and above, are preferred. Operating close to the atmospheric boiling point of the slurry, approximately 100-105 C., is preferred because the reaction rate is the highest possible without resorting to pressurized equipment. With pressurized equipment, the leach temperature can be increased to 200-300 C. if necessary. The optimum reagent combination is generally approximately equivalent amounts on an alkali metal basis of the carbonate and the hydroxide. When the alkali metal is sodium, on a sodium basis, 1 lb NaOH is equivalent to 1.325 lb $Na_2CO_3$. However, this portion is not necessarily critical. The benefits of using both reageants in combination are seen over a wide range of proportions, e.g., 20% $Na_2CO_3$–80% NaOH to 80% $Na_2CO_3$–20% NaOH on a sodium equivalent basis. The amount of sodium reagent to be used depends on the type of residue to be processed and how it responds to leaching. Generally, these residues are refractory and require significant concentrations of reagents even though only a small proportion is actually consumed.

Leaching of the residues by the process of the present invention can be effected by a variety of procedures known in the art, and the particular choice of method will be determined by the particular circumstances.

The leaching may be conducted as a two-stage countercurrent process to improve the use of the sodium salts. In a two-stage countercurrent leach, the residue feed is leached with liquor from the second leach, the filtrate (or decantate) from that leach is product liquor, and the residue is leached again in a second stage using fresh leach liquor.

After leaching, the residue can be washed and then conveyed to a suitable tailings disposal area. The vanadium-bearing liquor can be treated in a variey of ways which are known to those skilled in the art to which this invention pertains. The liquor can be acidified to about pH 3 and the vanadium can be extracted by a liquid-liquid extraction process using a water-insoluble amine dissolved in a hydrocarbon solvent. Tertiary amines with 8 to 10 carbon chains can be employed. The vanadium can then be stripped from the organic phase with aqueous ammonia, and ammonium metavanadate ($NH_4VO_3$) can be crystallized from the strip liquor by adding $(NH_4)_2SO_4$ and/or $H_2SO_4$ to adjust pH. The ammonium metavanadate can be converted into a variey of useful oxide products by calcining.

Another post leach option is to reuse the alkaline filtrate in leaching other vanadium-bearing materials which are not as refractory as the first residue leached. In this way the excess base from the first leach is not wasted, but is actually used again to leach more vanadium from residues more amenable to alkaline leaching, e.g., petroleum cokes from the Flexicoking process. Alternatively as indicated above, multiple-stage countercurrent leaching could be used on a given residue to maximize the ratio of vanadium recovered to base used.

The following examples are illustrative:

EXAMPLE 1

In order to demonstrate the benefits of leaching in accordance with the process of the present invention, three tests were conducted. The first was a comparative test using NaOH alone, the second a comparative test with $Na_2CO_3$ alone, and the third was test reflecting the benefits of using equal-sodium amounts of NaOH and $Na_2CO_3$. The residue used here was a scrubber sludge from a power plant and contained significant amounts of magnesium and calcium compounds. The residue (dry basis) contained 10.9% V, 12.0% Mg, 4.77% Ca, 2.00% Ni, 6.39% Fe, 2.95% S, 18.5% total C. An X-ray powder diffraction pattern showed that much of the magnesium was present as the base MgO (periclase).

The residue size was 100% −100 um, 90% −75 um, and 65% −40 um. Oxygen was bubbled in during leaching. After the 2-hour leach time, the slurries were filtered and the residues rinsed with several displacement volumes of water. The % V extractions were calculated based on the filtrate-rinse solution and dried residue analyses. The leach test results set forth in Table I below, show 25% vanadium extraction with NaOH, 24% with $Na_2CO_3$, and 50% extraction with a combination of both reagents but at the same sodium level. All three tests utilized 460 lb total sodium/ton residue.

TABLE I

POWER PLANT SCRUBBER ALKALINE LEACH TESTS

| Test | Leach % Solids | Leach Time (h) | Leach Temp (°C.) | lb NaOH/ Ton | lb $Na_2CO_3$/ Ton | % V Extn. |
|---|---|---|---|---|---|---|
| 1 | 15 | 2 | 75 | 800 | 0 | 25 |
| 2 | 15 | 2 | 75 | 0 | 1060 | 24 |
| 3 | 15 | 2 | 75 | 400 | 530 | 50 |

EXAMPLE 2

Additional examples of the benefits of the mixed $Na_2CO_3$-NaOH leach are given in Table II, test 4–21. The power plant scrubber sludge described above was used for these tests also. Oxygen or air was bubbled in at a rate sufficient to maintain a nearly saturated condition. For this residue, which was already in a highly oxidized state, the use of oxygen, air, or no oxidant at all made little difference in the V extraction. The leach procedure was the same as described for tests 1–3.

Test 4 and 5 (6-hour leaches) and 6 and 7 (16 hour leaches) show that an equal sodium mixture of NaOH and $Na_2CO_3$ gives better vanadium recoveries than $Na_2CO_3$ alone, even though the $Na_2CO_3$-only tests utilized about 23% more total sodium.

Test 4 and 6 also point out that harsher conditions, i.e., 6 or 16 hours at the atmospheric boiling point, give better extractions of vanadium (64 and 67%) than leaching 2 hours at 75 C. (test 3, 50% extraction).

Tests 8 and 9, 6-hour leaches with 690 lb total sodium/ton residue, show that somewhat better extraction was achieved when ⅔ of the sodium derived from NaOH (test 9) than from $Na_2CO_3$ (test 8). Tests 10 and 11, 16-hour leaches, show the same results.

The remainder of the tests in Table II were all with 920 lb total sodium per ton of residue. Test 12 and 13 show that when 50 or 67% of the sodium derives from NaOH, the extraction is the same (77%). Test 15 and 16 show the same thing for 16-hour leaches (81% extraction). When the proporation of sodium from NaOH was increased to 87.5% (tests 14 and 17), the vanadium extractions dropped significantly.

Tests 18–21 were all run at 10% solids, although the total sodium per ton residue remained the same as that for tests 12–17. The sodium in solution for tests 18–21 was 63% of the concentration of that for test 12–17. The vanadium extraction averaged 3% lower for the 10% solid leaches when compared with the 15% solid leaches run under otherwise the same conditions (test 12, 13, 15 16). The results of the data obtained in this example are set forth in Table II below:

TABLE II

POWER PLANT SCRUBBER SLUDGE ALKALINE LEACH TESTS

| Test | Leach % Solids | Leach Time (h) | Leach Temp | lb NaOH /Ton | lb $Na_2CO_3$ /Ton | Total Na lb/Ton | % V Extn. |
|---|---|---|---|---|---|---|---|
| 4 | 15 | 6 | reflux | 400 | 530 | 460 | 64 |
| 5 | 15 | 6 | reflux | 0 | 1302 | 565 | 56 |
| 6 | 15 | 16 | reflux | 400 | 530 | 460 | 67 |
| 7 | 15 | 16 | reflux | 0 | 1302 | 565 | 65 |
| 8 | 15 | 6 | reflux | 400 | 1060 | 690 | 68 |
| 9 | 15 | 6 | reflux | 800 | 530 | 690 | 72 |
| 10 | 15 | 16 | reflux | 400 | 1060 | 690 | 73 |
| 11 | 15 | 16 | reflux | 800 | 530 | 690 | 78 |
| 12 | 15 | 6 | reflux | 800 | 1060 | 920 | 77 |
| 13 | 15 | 6 | reflux | 1200 | 530 | 920 | 77 |
| 14 | 15 | 6 | reflux | 1400 | 265 | 920 | 64 |
| 15 | 15 | 16 | reflux | 800 | 1060 | 920 | 81 |
| 16 | 15 | 16 | reflux | 1200 | 530 | 920 | 81 |
| 17 | 15 | 16 | reflux | 1400 | 265 | 920 | 69 |
| 18 | 10 | 6 | reflux | 800 | 1060 | 920 | 75 |
| 19 | 10 | 16 | reflux | 800 | 1060 | 920 | 77 |
| 20 | 10 | 6 | reflux | 1200 | 530 | 920 | 73 |
| 21 | 10 | 16 | reflux | 1200 | 530 | 920 | 78 |

EXAMPLE 3

A power plant "bottom ash" was also investigated with regard to its amenability to a mixed $Na_2CO_3$-NaOH digestion procedure. The bottom ash was pulverized to 100% −150 μm (60% −75 μm, 49% −40 μm). Analysis (dry basis): 16.2% V. Semiquantitative emission spectrographic analysis showed 0.1–1% Ca and major amounts of Mg. An X-ray powder diffraction pattern revealed MgO and $Mg_3(VO_4)_2$ as principal phases.

Table III below presents the results of six leach tests with this material. All leaches were at 15% solids with oxygen bubbling through the slurry to maintain oxygen saturation. Test 21 and 22 of Table III show that 21% or 10% vanadium extraction was achieved for NaOH or $Na_2CO_3$. Using an equal sodium mixture of NaOH and $Na_2CO_3$ increased the extraction slightly, to 23%. Extraction was improved with harsher leach conditions, i.e. longer time and highter temperature (tests 25–27). However, this refractory material requires even harsher leach conditions than used here in order to obtain good extractions of vanadium. The results are set forth in Table III:

TABLE III

"BOTTOM ASH" ALKALINE LEACH TESTS

| Time | Leach Time (h) | Leach Temp (°C.) | lb NaOH/ Ton | lb $Na_2CO_3$/ Ton | Total Na lb/Ton | % V Extn. |
|---|---|---|---|---|---|---|
| 22 | 2 | 75 | 800 | 0 | 460 | 21 |
| 23 | 2 | 75 | 0 | 1060 | 460 | 10 |
| 24 | 2 | 75 | 400 | 530 | 460 | 23 |

TABLE III-continued

"BOTTOM ASH" ALKALINE LEACH TESTS

| Time | Leach Time (h) | Leach Temp (°C.) | lb NaOH/ Ton | lb Na2CO3/ Ton | Total Na lb/Ton | % V Extn. |
|---|---|---|---|---|---|---|
| 25 | 6 | 75 | 400 | 530 | 460 | 31 |
| 26 | 2 | reflux | 400 | 530 | 460 | 34 |
| 27 | 6 | reflux | 400 | 530 | 460 | 38 |

EXAMPLE 4

The mixed alkaline leach process was also applied to a scrubber sludge resulting from the gasification of residual oil. The sludge was dried and ground to 100% −150 μm (66% −75 μm, 36% −40 μm). Analysis: 10.7% V. Semiquantitative emission spectrographic analysis showed 0.2-2% Mg, 0.4-4% Ca, and major amounts of Fe. An X-ray powder diffraction pattern revealed the base FeO(OH). In addition to calcium and magnesium compounds, iron oxide is also a major acid consumer in this sludge.

Table IV below presents the results of leaching this sludge with oxygen bubbling through to maintain saturation. Extractions of 59% or 46% were achieved with NaOH or $Na_2CO_3$ (test 28 and 29). With an equal sodium mixture of NaOH and $Na_2CO_3$, the extraction increased to 63% (test 30), even though the total sodium was the same. Increasing the leach time from 2 to 6 hours increased the V extraction further, to 67% (test 31).

TABLE IV

RESIDUAL OIL CONVERSION SLUDGE ALKALINE LEACH TESTS

| Time | Leach Time (h) | Leach Temp (°C.) | lb NaOH/ Ton | lb Na2CO3/ Ton | Total Na lb/Ton | % V Extn. |
|---|---|---|---|---|---|---|
| 28 | 2 | 75 | 800 | 0 | 460 | 59 |
| 29 | 2 | 75 | 0 | 1060 | 460 | 46 |
| 30 | 2 | 75 | 400 | 530 | 460 | 63 |
| 31 | 6 | 75 | 400 | 530 | 460 | 67 |

EXAMPLE 5

A pressure leach test on the power plant scrubber sludge was performed to demonstrate the benefits of high temperature. This sludge was the same as used previously to generate data of Tables I and II. The test was run at 15% solids, 800 lb NaOH+1060 lb $Na_2CO_3$/ton sludge (920 lb total sodium/sludge) for 2 hours at 200 C. (plus an additonal hour of heat-up time) in a stirring autoclave. Total solution volume in the autoclave was 750 ml; sludge (dry basis) 132 g. After leaching, the slurry was cooled, filtered, and stage-rinsed with 530 ml water. The resultant vanadium extraction was 88%, based on the filtrate and residue analysis. This was significantly better than the atmospheric pressure results shown in Table II. The leach-rinse liquor (1.158 L) contained 10.4 g V/L. A sample was titrated with 1N HCl to determine the residual base strength. Three breaks in the titration curve were noted, at pH 11.3, 7.85, and 3.4. The break at 3.4 was assumed to represent total base. At this pH, 2.01 equivalents/liter had been titrated. The total base in the filtrate-rinse solution was thus 2.33 equivalents. This indicated 88% recovery, since the total base added as NaOH+$Na_2CO_3$ was 2.65 equivalents. However, in terms of useful base, the end point at pH 7.85 was more significant. This represented neutralization of $OH^-$ and conversion of $CO_3^{2-}$ to $HCO_3^-$. Also, orthovanadate ($VO_4^{3-}$) and pyrovanadate ($V_2O_7^{4-}$) were converted to metavanadate ($VO_3^-$) at this pH. The base strength was 1.413 equivalents/L, or expressed in terms of NaOH, 56.5 g NaOH/L. This represented a recovery of 62% of the original base added as NaOH and $Na_2CO_3$.

EXAMPLE 6

Test were run to demonstrate that the "useful" base remaining in this power plant scrubber sludge leach solution could be used to leach other V-bearing material. The material chosen was a petroleum coke from the Flexicoking process, which is a low acid consumer compared to the residues used in this invention, and is relatively amenable to basic leaching also. The powdered coke contained 5.4% V. Leach tests for 2 hours at 75 C. and 25% solids gave vanadium extractions of 73% for 100 lb NaOH/ton, 71% for 132.5 lb $Na_2CO_3$/ton (the sodium equivalent of 100 lb NaOH/ton), and 71% for 100 lb equivalent NaOH/ton added as the power plant scrubber sludge leach solution derived from the pressure leach test. Hence, the highly alkaline solutions from the residue leaches can be use very effectively to leach other vanadium-bearing materials which are generally amenable to alkaline leaching, such as coke from the Flexicoking process. In this way, the residual base remaining from leaching residues is not wasted.

Although the invention has been illustrated by the preceding examples, it is not to be construed as being limited to the materials employed therein, but rather, the invention is directed to the generic area as hereinbefore disclosed. Various modifications and embodiments can be made without departing from the spirit and scope thereof.

What is claimed is:

1. A process for recovering vanadium values from vanadium-bearing carbonaceous residues derived from petroleum refining or burning of carbonaceous fuels, and which contain high-acid consuming materials including significant amounts of magnesium, calcium and iron bases, which process comprises the steps of:
    (1) leaching said carbonaceous residues with an aqueous solution containing at least one alkaline metal carbonate and at least one alkaline metal hydroxide of from about 4:1 to about 1:4;
    (2) separating a vanadium-bearing liquor and
    (3) recovering vanadium values therefrom.

2. The process of claim 1 wherein the alkaline metal carbonate is sodium carbonate.

3. The process of claim 1 wherein the alkaline metal carbonate is potassium carbonate.

4. The process of claim 1 wherein the alkaline metal hydroxide is sodium hydroxide.

5. The process of claim 1 wherein the alkaline metal hydroxide is potassium hydroxide.

6. The process of claim 1 wherein at least one alkaline metal carbonate is sodium carbonate, and wherein the alkaline metal hydroxide is sodium hydroxide.

7. The process of claim 1 wherein at least one alkaline metal hydroxide is sodium hydroxide, and wherein the alkaline metal carbonate is sodium carbonate.

8. The process of claim 6 or 7 wherein the ratio of sodium carbonate to sodium hydroxide is within the range of from about 1 part sodium carbonate and 3 parts sodium hydroxide to 2 parts sodium carbonate and 1 part sodium hydroxide on a sodium equivalent basis.

9. The process of claim 1 which is effected at a temperature up to the atmospheric boiling point of the slurry formed by the residue and the aqueous leaching solution.

10. The process of claim 1 which is effected under pressure at a temperature of up to about 300 C.

11. The process of claim 1 which is conducted in the presence of an oxidant.

12. The process of claim 10 wherein the oxidant is oxygen.

13. The process of claim 10 wherein the oxidant is air.

14. The process of claim 1 wherein said carbonaceous residue in present in the leach solution in an amount up to about 30% by weight.

15. The process of claim 1 wherein the vanadium-bearing carbonaceous residue is fly ash.

16. The process of claim 1 wherein the vanadium-bearing carbonaceous residue is boiler ash.

17. The process of claim 1 wherein the vanadium-bearing carbonaceous residue is scrubber sludge from the combustion of crude oil fraction.

18. The process of claim 1 wherein the vanadium-bearing carbonaceous residue has a particle size no greater than will pass through a 100 mesh screen.

19. The process of claim 1, wherein the alkaline metal carbonate is sodium carbonate and the alkaline metal hydroxide is sodium hydroxide and wherein the ratio of carbonate to hydroxide is in a range between 2:1 and 1:3 on a sodium equivalent basis, and wherein the sodium concentrate per ton of said carbonaceous residue lies between 200 to 2,000 pounds of sodium per ton of residue.

* * * * *